(12) United States Patent
Matias et al.

(10) Patent No.: US 9,213,748 B1
(45) Date of Patent: Dec. 15, 2015

(54) GENERATING RELATED QUESTIONS FOR SEARCH QUERIES

(71) Applicant: Google Inc., Mountain View, CA (US)

(72) Inventors: Yossi Matias, Tel Aviv (IL); Dvir Keysar, Herzliya (IL); Gal Chechik, Los Altos, CA (US); Ziv Bar-Yossef, Herzliya (IL); Tomer Shmiel, Ramat-Gan (IL)

(73) Assignee: Google Inc., Mountain View, CA (US)

( * ) Notice: Subject to any disclaimer, the term of this patent is extended or adjusted under 35 U.S.C. 154(b) by 272 days.

(21) Appl. No.: 13/828,436

(22) Filed: Mar. 14, 2013

(51) Int. Cl.
*G06F 17/30* (2006.01)

(52) U.S. Cl.
CPC .............................. *G06F 17/30554* (2013.01)

(58) Field of Classification Search
CPC .......... G06F 17/30864; G06F 17/3053; G06F 17/30654; G06F 17/30663; G06F 17/30684; G06F 17/30867; G06F 17/30646; G06F 17/30693; G06F 17/30696
USPC ................... 707/722, 706, 708, 738, 766; 1/1
See application file for complete search history.

(56) References Cited

U.S. PATENT DOCUMENTS

| | | | |
|---|---|---|---|
| 6,766,320 B1 | 7/2004 | Wang et al. | |
| 7,664,734 B2 | 2/2010 | Lawrence et al. | |
| 7,685,191 B1 * | 3/2010 | Zwicky et al. | 707/706 |
| 7,827,170 B1 * | 11/2010 | Horling et al. | 707/722 |
| 8,135,712 B1 | 3/2012 | Coladonato et al. | |
| 8,229,734 B2 | 7/2012 | Bennett | |
| 8,768,920 B1 * | 7/2014 | Coladonato et al. | 707/730 |
| 2001/0047355 A1 | 11/2001 | Anwar | |
| 2008/0033970 A1 * | 2/2008 | Jones et al. | 707/100 |
| 2009/0083222 A1 * | 3/2009 | Craswell et al. | 707/3 |
| 2010/0030769 A1 * | 2/2010 | Cao et al. | 707/5 |
| 2010/0030770 A1 * | 2/2010 | Cao et al. | 707/5 |
| 2010/0049498 A1 * | 2/2010 | Cao et al. | 704/9 |
| 2010/0228777 A1 * | 9/2010 | Imig et al. | 707/772 |
| 2012/0059816 A1 | 3/2012 | Narayanan et al. | |
| 2014/0067816 A1 * | 3/2014 | Kanungo et al. | 707/740 |
| 2014/0149379 A1 | 5/2014 | Hjelming et al. | |
| 2014/0181096 A1 * | 6/2014 | Zhuang et al. | 707/727 |
| 2014/0281890 A1 * | 9/2014 | D'Angelo et al. | 715/234 |

\* cited by examiner

*Primary Examiner* — Dennis Truong
(74) *Attorney, Agent, or Firm* — Fish & Richardson P.C.

(57) ABSTRACT

Methods, systems, and apparatus, including computer programs encoded on computer storage media, for identifying related questions for a search query is described. One of the methods includes receiving a search query from a user device; obtaining a plurality of search results for the search query provided by a search engine, wherein each of the search results identifies a respective search result resource; determining one or more respective topic sets for each search result resource, wherein the topic sets for the search result resource are selected from previously submitted search queries that have resulted in users selecting search results identifying the search result resource; selecting related questions from a question database using the topic sets; and transmitting data identifying the related questions to the user device as part of a response to the search query.

18 Claims, 6 Drawing Sheets

GENERATING RELATED QUESTIONS FOR SEARCH QUERIES

BACKGROUND

This specification relates to digital data processing and, in particular, to search systems.

Internet search engines deliver search results in the form of information about Internet resources (e.g., Web pages, images, text documents, multimedia content). The search results are in response to a user submitted search query. Search results contain a number of objects related to the search query and each object includes, for example, a Uniform Resource Locator (URL) of a resource and a snippet of the information of the resource. The search results can be ranked (e.g., in an order) according to scores assigned to the search results.

SUMMARY

In general, one aspect of the subject matter described in this specification can be embodied in methods that include the actions of receiving a search query from a user device; obtaining a plurality of search results for the search query provided by a search engine, wherein each of the search results identifies a respective search result resource; determining one or more respective topic sets for each search result resource, wherein the topic sets for the search result resource are selected from previously submitted search queries that have resulted in users selecting search results identifying the search result resource; selecting related questions from a question database using the topic sets, wherein selecting the related questions comprises identifying questions from the question database matching at least one of the topic sets; and transmitting data identifying the related questions to the user device as part of a response to the search query.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The question database can include previously submitted search queries that have been determined to be in question form. Determining the topic sets for each search result resource can include: identifying qualified search queries for the search result resource, wherein a qualified search query is a previously submitted search query that resulted in a user selecting a search result that identifies the search result resource; ranking the qualified search queries based on a first number of times each query has been submitted or based on a second number of times users have selected a search result identifying the search result resource after submitting each query; and selecting one or more highest-ranked qualified search queries as the topic sets for the search result resource.

Selecting related questions using the topic sets can further include: ranking the matching questions; for each matching question, determining whether a higher-ranked question is equivalent to the question and, if a higher-ranked question is equivalent to the question, removing the question from the ranking; and selecting one or more of the matching questions as related questions based on the ranking.

The method can further include replacing a first matching question with a best variant of the first matching question, wherein the best variant for a first matching question is a question from a group of equivalent questions to the first matching question that has been most frequently submitted to the search engine as a search query. The method can further include: generating a graph including a respective node for each question in the question database; identifying selected resources for each of the questions, wherein the selected resources for each question are resources for which users have selected search results identifying the resources in response to submitting the question as search query; identifying each pair of queries having at least a threshold number of common selected resources as equivalent queries; and connecting the nodes representing each identified pair of questions with a link in the graph.

Determining whether a higher-ranked question is equivalent to the question can include: determining whether any nodes in the graph that represent higher-ranked questions are connected to the node representing the question by a link. Ranking the matching questions can include ranking the matching questions based on a number of times each question has been submitted to a search engine as a search query. The method can further include generating additional questions by incorporating one or more of the topic sets into a pre-defined question template.

The subject matter described in this specification can be implemented in particular embodiments so as to realize one or more of the following advantages. A user can easily view a set of questions that are relevant to a search query submitted by the user. Additionally, the user can easily obtain additional information to satisfy their information need by selecting one or more of the related questions and submitting the displayed content of the question as a new search query. Providing related questions to users can help users gain a quick understanding of the major knowledge areas in a newly-explored topic, e.g., by informing the user of the most popular questions about the topic that have been submitted as search queries to a search engine. Providing related questions to users can help users who are using un-common keywords or terminology in their search query to identify keywords or terms that are more commonly used to describe their intent. The user experience can be improved by submitting the displayed content of a related question as a new search query and receiving a pre-determined, pre-formatted answer to the related question as part of a response from the search engine.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
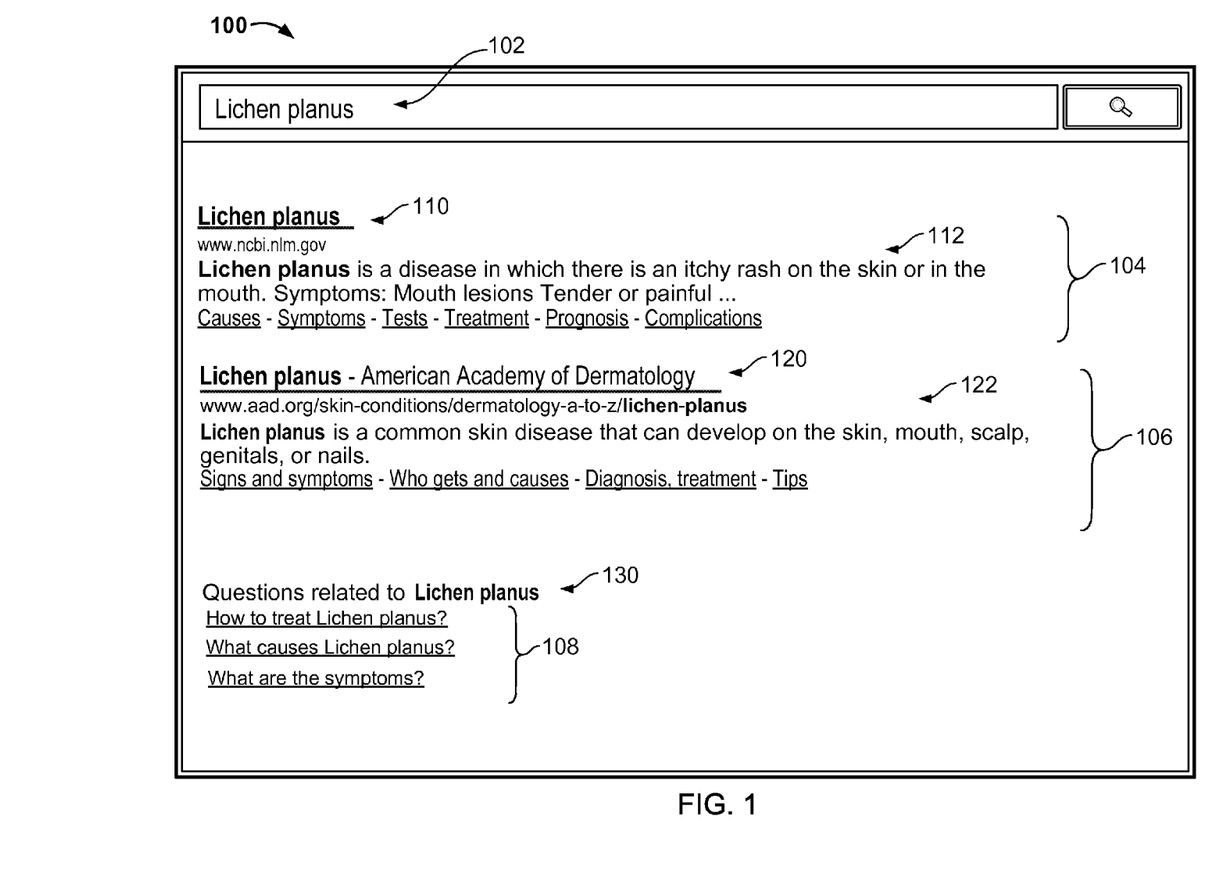
FIG. 1 shows an example search results page.

FIG. 1 shows an example search results page 100 for a search query 102 "Lichen planus." The search results page 100 includes two search results 104 and 106 and related questions 108. The search results 104 and 106 and the related questions 108 are generated by a search system in response to the search query 102. The search results 104 and 106 each identify a respective resource and include respective titles 110 and 120 and respective text snippets 112 and 122 that are extracted from the resources identified by the search results. The search system generates the search results 104 and 106 using conventional search techniques.

The related questions 108 are questions that have been identified by the search system as being related to the search query 102, i.e., "Lichen planus", and are displayed under a title 130 in the search results page 100. Each of the questions 108 is presented in the form of a link by which a user can obtain search results for a query derived from the text of the selected question.

In some other implementations, the questions 108 are presented as an answer box, i.e., a formatted presentation of content that is relevant to the query. Additionally, in some implementations, a "show frequently asked questions" user interface element is displayed in the search results page 100, and the questions 108 are presented to the user in response to receiving a user input selecting the user interface element.

Figure 2:
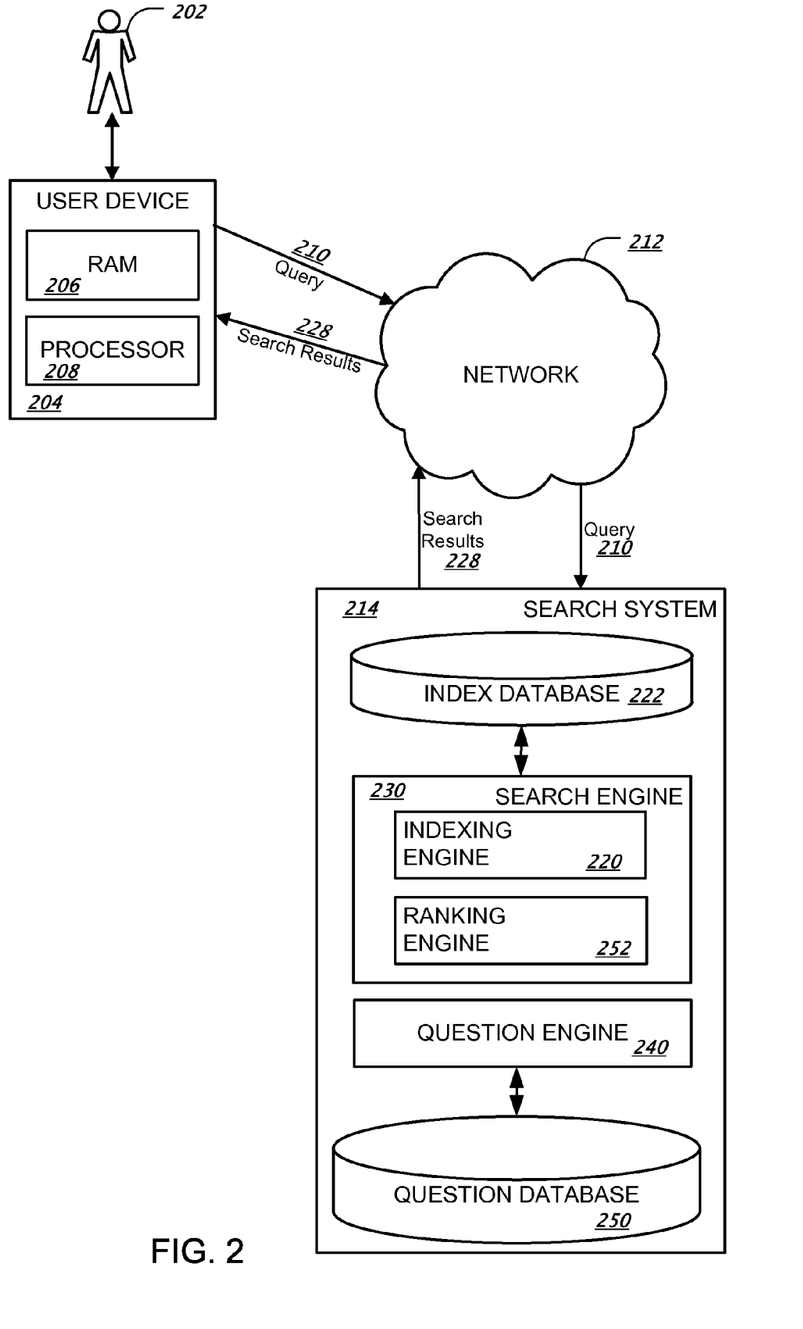
FIG. 2 is a block diagram of an example search system.

FIG. 2 is a block diagram of an example search system 214. The search system 214 is an example of an information retrieval system implemented as computer programs on one or more computers in one or more locations, in which the systems, components, and techniques described below can be implemented.

A user 202 can interact with the search system 214 through a user device 204. The user device 204 will generally include a memory, e.g., a random access memory (RAM) 206, for storing instructions and data and a processor 208 for executing stored instructions. The memory can include both read only and writable memory. For example, the user device 204 can be a computer coupled to the search system 214 through a data communication network 212, e.g., local area network (LAN) or wide area network (WAN), e.g., the Internet, or a combination of networks, any of which may include wireless links.

In some implementations, the search system 214 provides a user interface to the user device 204 through which the user 202 can interact with the search system 214. For example, the search system 214 can provide a user interface in the form of web pages that are rendered by a web browser running on the user device 204.

A user 202 can use the user device 204 to submit a query 210 to a search system 214. A search engine 230 within the search system 214 performs a search to identify resources matching the query. When the user 202 submits a query 210, the query 210 may be transmitted through the network 212 to the search system 214. The search system 214 includes an index database 222 and the search engine 230. The search system 214 responds to the query 210 by generating search results 228, which are transmitted through the network to the user device 204 for presentation to the user 102, e.g., as a search results web page to be displayed by a web browser running on the user device 204.

In this specification, the term "database" will be used broadly to refer to any collection of data: the data does not need to be structured in any particular way, or structured at all, and it can be stored on multiple storage devices in one or more locations. Thus, for example, the index database 222 can include multiple collections of data, each of which may be organized and accessed differently. Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

When the query 210 is received by the search engine 230, the search engine 230 identifies resources that satisfy the query 210. The search engine 230 will generally include an indexing engine 220 that indexes resources, an index database 222 that stores the index information, and a ranking engine 252 or other software that generates scores for the resources that satisfy the query 210 and that ranks the resources according to their respective scores.

The search system 214 also includes or can communicate with a question engine 240 that generates questions that are related to the received search query 210. The question engine 240 generates a set of related questions using questions from a question database 250 and transmits information identifying the selected questions to the user device 204 as part of a response to the search query 210, e.g., with the search results 228 or in place of the search results 228. Generating the set of related questions is described in more detail below with reference to FIGS. 3-6.

The question database 250 includes search queries that have previously been submitted by users to the search system 214 and that have been determined to be in question form. A query can be determined to be in question form if, e.g., the query includes one of a pre-determined set of question terms. The predetermined set of question terms can include one or more of interrogative words, e.g., interrogative determiners, interrogative pronouns, and interrogative pro-adverbs, other function words that are frequently used to ask a question, or punctuation marks, e.g., question marks. As another example, a query can be determined to be in question form if the query matches one of a predetermined set of question query templates, e.g., "why is [X] used," where [X] is a placeholder for one or more query terms. In some implementations, the question database includes only search queries that have been submitted to the search system 250 more than a threshold number of times. Optionally, the question database 250 can also include questions obtained from other sources, e.g., from content published on resources. For example, the question database can also include questions obtained from question and answer websites, e.g., phrases that are identified as questions in the text of the websites.

Figure 3:
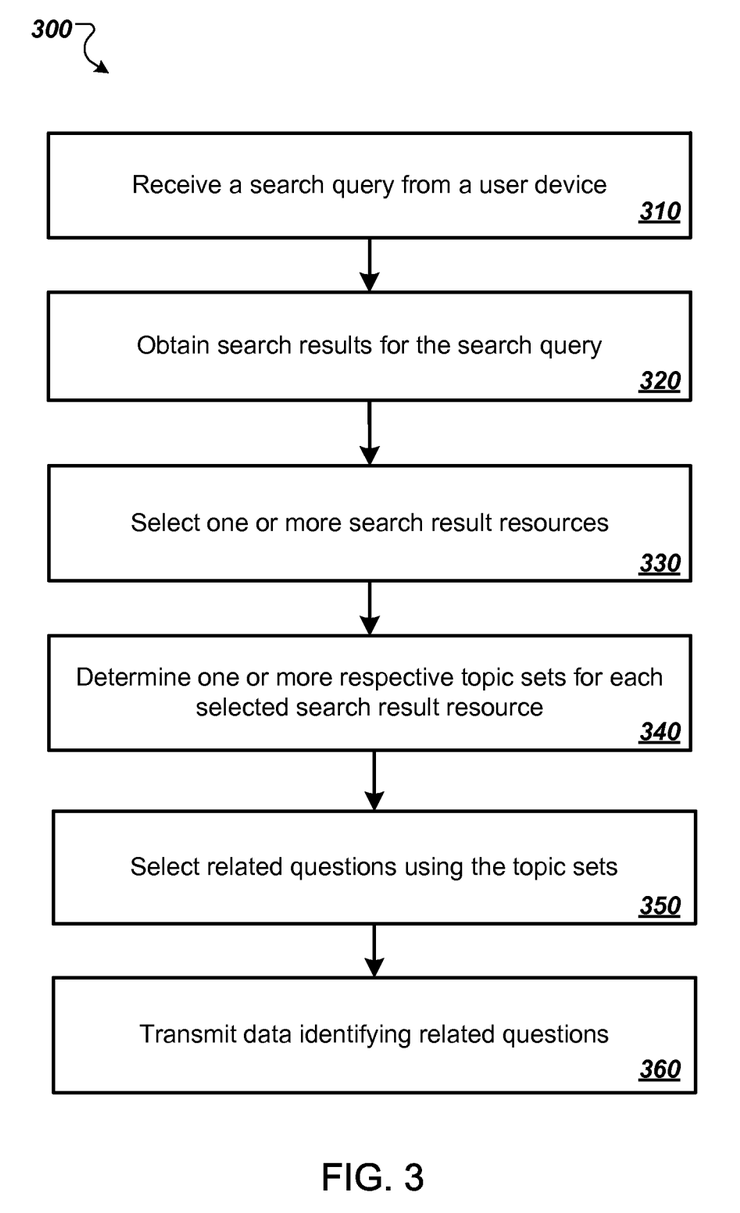
FIG. 3 is a flow diagram of an example process for selecting questions to be included in a response to a search query.

FIG. 3 is a flow diagram of an example process 300 for selecting questions to be included in a response to a received search query. For convenience, the process 300 will be described as being performed by a system of one or more computers located in one or more locations. For example, a search system, e.g., the search system 214 of FIG. 2 can be used to perform the process 300.

The system receives a search query from a user device (step 310) and obtains search results for the search query from a search engine (step 320). Each search result identifies a respective search result resource. The system also obtains scores for each of the search result resources from the search engine.

The system selects one or more of the search result resources (step 330). The system can select, for example, a predetermined number of highest-scoring search result resources or each search result resource having a score that exceeds a threshold score.

The system determines one or more topic sets for each selected search result resource (step 340). The system selects the topic sets for a given search result resource from previously submitted search queries in response to which users have selected search results identifying the search result resource. Determining a topic set for a search result resource is described in more detail below with reference to FIG. 4.

The system selects related questions using the topic sets (step 350). Selecting related questions using topic sets is described in more detail below with reference to FIGS. 5 and 6. Once the related questions have been selected, the system ranks the selected questions based at least in part on the number of times each of the related questions has been submitted to the search engine as a search query.

In some implementations, the system has access to data that associates particular question queries with answers. The answers may be, e.g., pre-selected answers that are provided as a formatted presentation in responses to the particular question queries generated by the system or by a search engine. Generally, the answers are derived from the text of a resource, i.e., text that has been determined to be an answer to the question posed in the question query. In some implementations, multiple answers may be associated with a single question.

In implementations where the system has access to data that associates particular question queries with answers, the system can rank the selected questions based at least in part on whether the question is associated with an answer, and, if the question is associated with an answer, on the quality of the answer that is provided for the question. For example, questions with no answer can be demoted in the ranking or questions with answers can be promoted in the ranking.

The system can measure the quality of an answer based on any of a variety of factors. For example, the quality of the answer may be based at least in part on a quality score generated by the search engine for the resource from which the answer is derived. As another example, the quality of the answer may be based in part on a ranking of a search result identifying the resource from which the answer is derived in a ranking of search results generated by the search engine in response to the question being submitted as a search query. As another example, the quality of the answer may be based in part on the length of the answer, i.e., the number of tokens, terms, or characters in the answer. As another example, if multiple answers are available for a given question, the quality of each answer can be based in part on the number or proportion of terms in the answer that are repeated in other answers for the question.

The system transmits data identifying the related questions to the user device as part of the response to the search query (step 360) for presentation to the user in accordance with the ranking.

Figure 4:
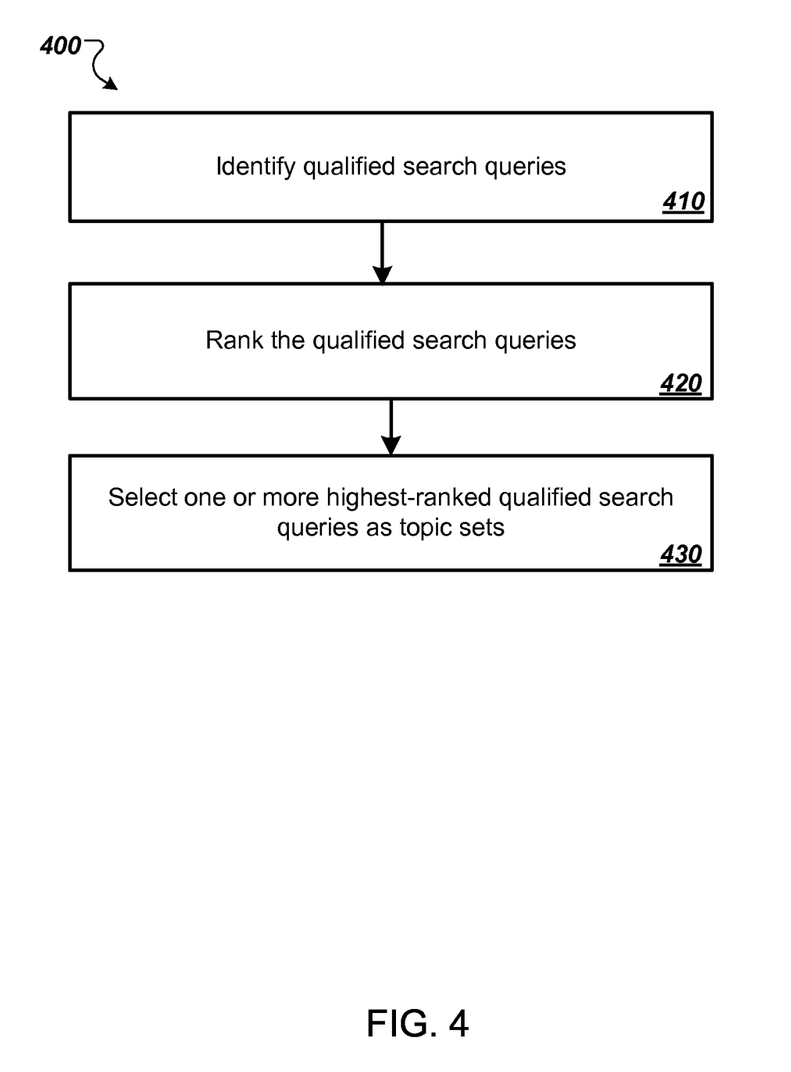
FIG. 4 is a flow diagram of an example process for determining topic sets.

FIG. 4 is a flow diagram of an example process 400 for determining a topic set for a search result resource. For convenience, the process 400 will be described as being performed by a system of one or more computers located in one or more locations. For example, a search system, e.g., the search system 214 of FIG. 2 can be used to perform the process 400.

The process 400 can be performed for each of a group of search result resources, e.g., for each of the selected search result resources described above with reference to FIG. 3.

The system identifies qualified search queries for the search result resource (step 410). A qualified search query for a given search result resource is a previously submitted search query that has resulted in a user selecting a search result that identifies the search result resource, i.e., a search query in response to which at least one user has selected a search result that identifies the search result resource. A selection of a search result can be, e.g., a user action made with respect to the search result that initiates a request for the resource identified by the search result. For example, the user action with respect to the search result may be a "click" on the search result using the cursor of an input device, a voice-based selection, or a selection by a user's finger on a presence-sensitive input mechanism, e.g., a touch-screen device, or any other appropriate selection mechanism. In some implementations, selection data may not be tethered to the identity of individual users.

The system ranks the qualified search queries (step 420). The system can rank the qualified search queries, e.g., based on a number of times each query has been submitted or based on a number of times users have selected a search result identifying the search result resource after submitting the search query.

The system selects one or more highest-ranked qualified search queries as topic sets for the search result resource (step 430).

In some implementations, once the topic sets for each search result resource in the group have been selected, the system can filter out particular topic sets. For example, the system can filter out any topic set that has been selected as the topic set for less than a threshold number or threshold proportion of search result resources in the group.

Figure 5:
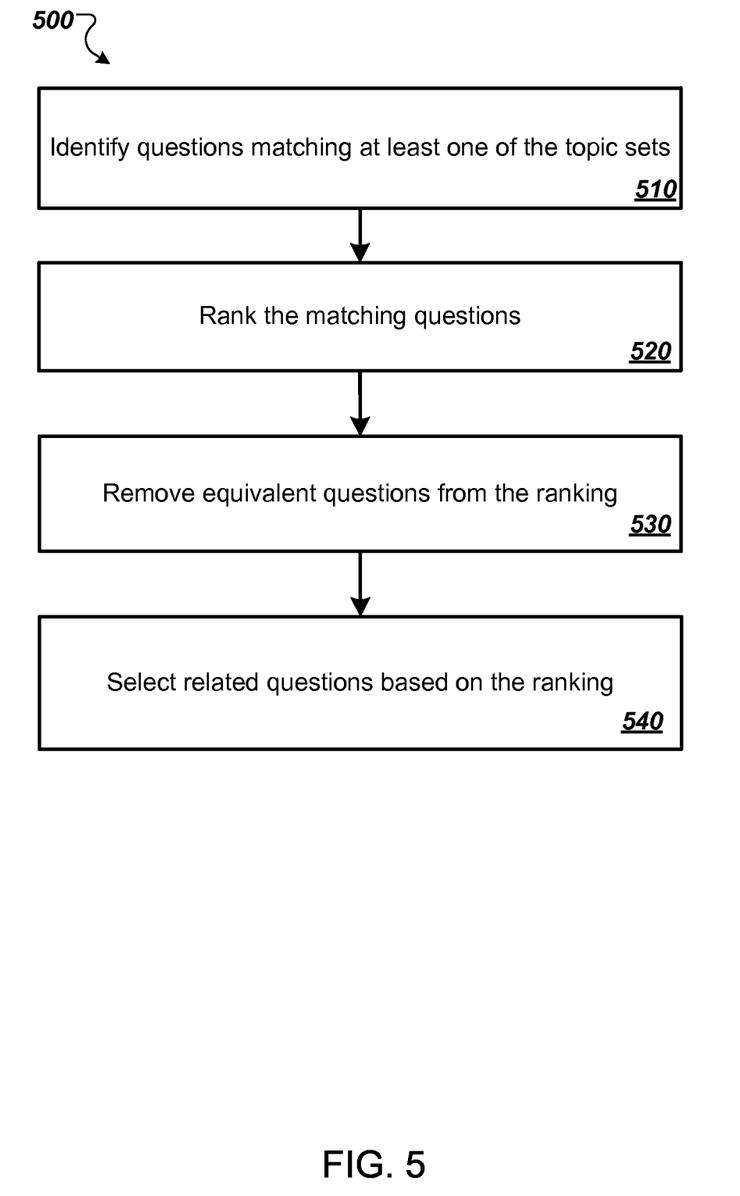
FIG. 5 is a flow diagram of an example process for generating related questions.

FIG. 5 is a flow diagram of an example process 500 for selecting related questions using topic sets. For convenience, the process 500 will be described as being performed by a system of one or more computers located in one or more locations. For example, a search system, e.g., search system 214 of FIG. 2 can be used to perform the process 500.

The system identifies questions in a question database, e.g., question database 250 of FIG. 2, that match at least one of the topic sets (step 510). The system can consider any question in the question database that includes each term included in a given topic set as being a matching question for the topic set. Optionally, the system can also generate additional matching questions using question templates. That is, the system can apply one or more pre-determined templates to the topic sets to generate additional matching questions. For example if a topic set is a disease name A, then the template question "What is the cure for [disease]" may be used to generate the question "What is the cure for A?" The system ranks the matching questions based on the number of times each question has been submitted to a search engine as a search query (step 520).

The system removes equivalent questions from the ranking of matching questions (step 530). Two questions are equivalent questions if they have an equivalent meaning. If two questions are determined to be equivalent, the system can remove the lower-ranked question from the ranking. The system identifies the equivalent questions using a question graph. The question graph includes nodes that each represent a respective question in the question database. Two nodes are connected by a link in the question graph if the questions represented by the nodes have been determined to be equivalent. Generating a question graph is described in more detail below with reference to FIG. 6. For each question in the ranking of questions, the system determines whether a node representing the question is connected to any nodes representing any higher-ranked questions in the question graph. If the node representing the question in the question graph is connected to a node representing a higher-ranked question, the system removes the question from the ranking.

Optionally, for each equivalent question that is removed, the system combines the counts of submissions for the two equivalent questions and assigns the total count to the remaining equivalent question as the number of times the remaining question has been submitted to the search engine.

Further optionally, for one or more of the remaining questions, the system can determine a best variant of the question and replace the question with the best variant of the question. The best variant for a particular question can be selected from questions that are identified in the question graph as being equivalent to the particular question, i.e., the questions that are represented in the question graph by nodes that are connected to the node representing the particular question. For example, the best variant can be the equivalent question that has been most frequently submitted to the search engine as a search query. Alternatively, the system can determine the best variant for a particular question based on pre-determined templates. That is, the system can determine that the particular question matches a pre-determined template and apply the template to generate the best variant. For example, one of the pre-determined templates may specify that for queries of the form "what is the age of [X]," the best variant is "how old is [X]".

Depending on the implementation, when a question is replaced by a best variant, the system can assign to the best variant as the number of times the best variant has been submitted to the search engine the number that is assigned to the question query being replaced by the best variant or the number of times the best variant has actually been submitted. Further, in some implementations, after equivalent questions have been removed or best variants have been identified, the system can re-rank the questions and then again perform step 530 to identify additional equivalent questions.

The system selects the related questions based on the ranking (step 540). For example, the system can select a pre-determined number of highest-ranked questions or each question that has been submitted to the search engine more than a pre-determined number of times.

Figure 6:
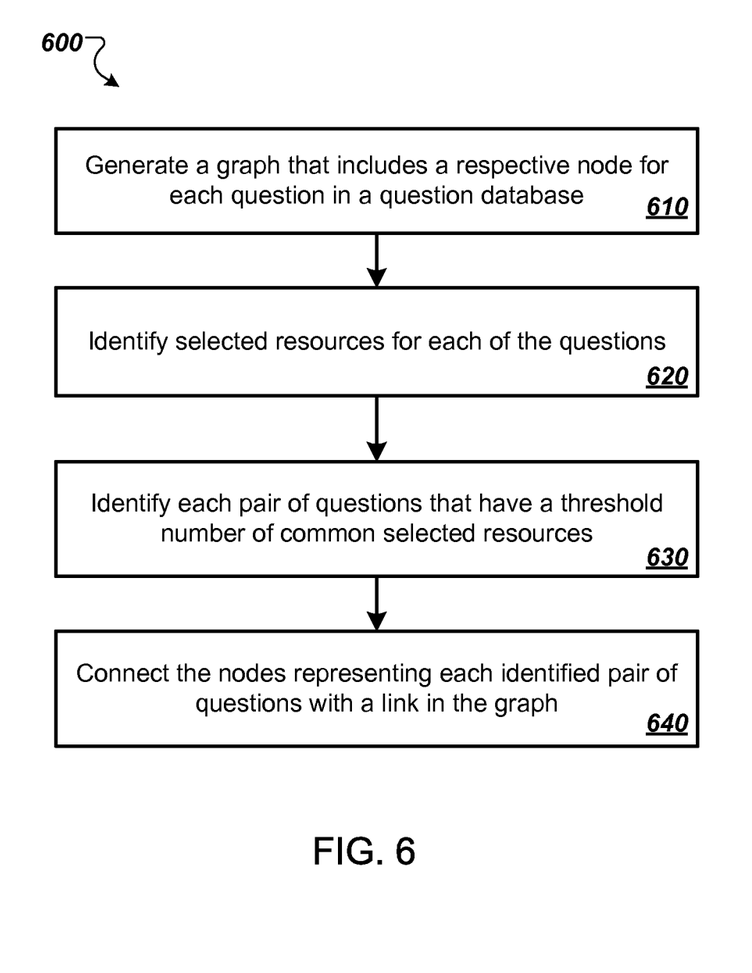
FIG. 6 is a flow diagram of an example process for finding equivalent questions.

FIG. 6 is a flow diagram of an example process 600 for generating a question graph. For convenience, the process 600 will be described as being performed by a system of one or more computers located in one or more locations. For example, a search system, e.g., search system 214 of FIG. 2, can be used to perform the process 600.

The system generates a graph that includes a respective node for each question in a question database, e.g., the question database 250 of FIG. 2 (step 610).

The system identifies selected resources for each of the questions (step 620) based on user selections of search results in response to previous submissions of the questions as search queries to a search engine. The selected resources for a given question are resources for which users have selected search results identifying the resources in response to submitting the question as query to the search engine. Optionally, the system can identify only resources that have received more than a threshold number of selections or a pre-determined number of resources that have received the most selections.

The system identifies each pair of questions that have at least a threshold number of common selected resources (step 630) and connects the nodes representing each identified pair of questions with a link in the graph (step 640). For example, the system can connect the nodes representing any pair of questions that have at least a first threshold number, of common selected resources, e.g., one or three, among a pre-determined number of most-selected selected resources, e.g., three, five, or ten, for each question.

Alternatively, instead of or in addition to connecting nodes based on common selected resources, the system can submit each question to the search engine as a search query and obtain search results for each question query. The system can then connect the nodes representing any pair of questions for which at least a first threshold number of search results among a pre-determined number of highest-ranked search results for the two questions identify the same resource. For example, the system may connect the nodes representing any pair of questions where at least, e.g., two search results, in, e.g., the ten highest-ranked search results, for one question in the pair identify the same resource as a search result in the same number of highest-ranked search results for the other question in the pair.

Embodiments of the subject matter and the operations described in this specification can be implemented in digital electronic circuitry, in computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which can also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program can, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what can be claimed, but rather as descriptions of features that can be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing can be advantageous.

What is claimed is:

1. A method performed by one or more computers, the method comprising:
    receiving a search query from a user device;
    obtaining a plurality of search results for the search query provided by a search engine, wherein each of the search results identifies a respective search result resource;
    selecting, for each search result resource identified by the search results for the search query, one or more topic queries from a query database that includes previously submitted search queries that have resulted in users selecting search results identifying the search result resource;
    selecting related questions from a question database that includes previously submitted search queries that have been determined to be in question form, each selected related question being a previously submitted search query that has been determined to be in question form and that matches at least one of the topic queries; and transmitting data identifying the related questions to the user device as part of a response to the search query.

2. The method of claim 1, wherein selecting the one or more topic queries for each search result resource comprises:

identifying qualified search queries for the search result resource, wherein a qualified search query is a previously submitted search query that resulted in a user selecting a search result that identifies the search result resource;

ranking the qualified search queries based on a first number of times each query has been submitted or based on a second number of times users have selected a search result identifying the search result resource after submitting each query; and selecting one or more highest-ranked qualified search queries as the topic queries for the search result resource.

3. The method of claim 1, wherein selecting related questions further comprises:

ranking the questions from the question database that match at least one of the topic queries;

for each matching question, determining whether a higher-ranked question is equivalent to the matching question and, if a higher-ranked question is equivalent to the matching question, removing the matching question from the ranking; and selecting one or more of the matching questions as related questions based on the ranking.

4. The method of claim 3, further comprising replacing a first matching question with a best variant of the first matching question, wherein the best variant for a first matching question is a question from a group of equivalent questions to the first matching question that has been most frequently submitted to the search engine as a search query.

5. The method of claim 3, further comprising:

generating a graph including a respective node for each question in the question database;

identifying selected resources for each of the questions, wherein the selected resources for each question are resources for which users have selected search results identifying the resources in response to submitting the question as search query;

identifying each pair of queries having at least a threshold number of common selected resources as equivalent queries; and connecting the nodes representing each identified pair of questions with a link in the graph.

6. The method of claim 5, wherein determining whether a higher-ranked question is equivalent to the matching question comprises:

determining whether any nodes in the graph that represent higher-ranked questions are connected to the node representing the matching question by a link; and determining that a higher-ranked question is equivalent to the matching question when the node in the graph that represents the higher-ranked question is connected to the node in the graph representing the matching question by a link.

7. The method of claim 3, wherein ranking the matching questions comprises ranking the matching questions based on a number of times each matching question has been submitted to a search engine as a search query.

8. The method of claim 1, further comprising generating additional questions by incorporating one or more of the topic queries into a predefined question template.

9. A system comprising one or more computers and one or more storage devices storing instructions that, when executed by the one or more computers, cause the one or more computers to perform operations comprising:

receiving a search query from a user device;

obtaining a plurality of search results for the search query provided by a search engine, wherein each of the search results identifies a respective search result resource;

selecting, for each search result resource identified by the search results for the search query, one or more topic queries from a query database that includes previously submitted search queries that have resulted in users selecting search results identifying the search result resource;

selecting related questions from a question database that includes previously submitted search queries that have been determined to be in question form, each selected related question being a previously submitted search query that has been determined to be in question form and that matches at least one of the topic queries; and transmitting data identifying the related questions to the user device as part of a response to the search query.

10. The system of claim 9, wherein selecting the one or more topic queries for each search result resource comprises:

identifying qualified search queries for the search result resource, wherein a qualified search query is a previously submitted search query that resulted in a user selecting a search result that identifies the search result resource;

ranking the qualified search queries based on a first number of times each query has been submitted or based on a second number of times users have selected a search result identifying the search result resource after submitting each query; and selecting one or more highest-ranked qualified search queries as the topic queries for the search result resource.

11. The system of claim 9, wherein selecting related questions further comprises:

ranking the questions from the question database that match at least one of the topic queries;

for each matching question, determining whether a higher-ranked question is equivalent to the matching question and, if a higher-ranked question is equivalent to the matching question, removing the matching question from the ranking; and selecting one or more of the matching questions as related questions based on the ranking.

12. The system of claim 11, further comprising:

generating a graph including a respective node for each question in the question database;

identifying selected resources for each of the questions, wherein the selected resources for each question are resources for which users have selected search results identifying the resources in response to submitting the question as search query;

identifying each pair of queries having at least a threshold number of common selected resources as equivalent queries; and connecting the nodes representing each identified pair of questions with a link in the graph.

13. The system of claim 12, wherein determining whether a higher-ranked question is equivalent to the matching question comprises:

determining whether any nodes in the graph that represent higher-ranked questions are connected to the node representing the matching question by a link; and determining that a higher-ranked question is equivalent to the matching question when the node in the graph that represents the higher-ranked question is connected to the node in the graph representing the matching question by a link.

14. The system of claim 11, wherein ranking the matching questions comprises ranking the matching questions based on a number of times each matching question has been submitted to a search engine as a search query.

15. A computer storage medium encoded with a computer program, the program comprising instructions that when executed by one or more computers cause the one or more computers to perform operations comprising:
receiving a search query from a user device;
obtaining a plurality of search results for the search query provided by a search engine, wherein each of the search results identifies a respective search result resource;
selecting, for each search result resource identified by the search results for the search query, one or more topic queries from a query database that includes previously submitted search queries that have resulted in users selecting search results identifying the search result resource;
selecting related questions from a question database that includes previously submitted search queries that have been determined to be in question form, each selected related question being a previously submitted search query that has been determined to be in question form and that matches at least one of the topic queries; and
transmitting data identifying the related questions to the user device as part of a response to the search query.

16. The computer storage medium of claim 15, wherein selecting the one or more topic queries for each search result resource comprises:
identifying qualified search queries for the search result resource, wherein a qualified search query is a previously submitted search query that resulted in a user selecting a search result that identifies the search result resource;
ranking the qualified search queries based on a first number of times each query has been submitted or based on a second number of times users have selected a search result identifying the search result resource after submitting each query; and
selecting one or more highest-ranked qualified search queries as the topic queries for the search result resource.

17. The computer storage medium of claim 15, wherein selecting related questions further comprises:
ranking the questions from the question database that match at least one of the topic queries;
for each matching question, determining whether a higher-ranked question is equivalent to the matching question and, if a higher-ranked question is equivalent to the matching question, removing the matching question from the ranking; and
selecting one or more of the matching questions as related questions based on the ranking.

18. The computer storage medium of claim 17, wherein ranking the matching questions comprises ranking the matching questions based on a number of times each matching question has been submitted to a search engine as a search query.

* * * * *